United States Patent
Downing

(10) Patent No.: US 6,748,079 B1
(45) Date of Patent: Jun. 8, 2004

(54) METHOD AND SYSTEM FOR RECORDING DATA ON AND READING DATA FROM AN OPTICAL MEDIUM

(75) Inventor: Daniel D. Downing, Montara, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/414,078

(22) Filed: Oct. 6, 1999

Related U.S. Application Data

(60) Provisional application No. 60/104,296, filed on Oct. 14, 1998.

(51) Int. Cl.[7] ............................................. H04N 7/167
(52) U.S. Cl. ...................... 380/201; 380/204; 380/210; 380/240; 705/57; 713/194; 360/28; 360/50; 386/94; 386/125; 369/47.12; 369/47.13; 369/47.19; 369/30.22
(58) Field of Search ................................. 380/204, 201, 380/210, 239, 240; 348/720; 713/194; 705/57; 386/94, 123; 360/27, 28, 50, 55; 369/47.12, 47.13, 47.19, 30.21, 30.22

(56) References Cited

U.S. PATENT DOCUMENTS

| | | | | |
|---|---|---|---|---|
| 4,998,252 A | * | 3/1991 | Suzuki et al. ................ | 714/756 |
| 5,077,721 A | * | 12/1991 | Sako et al. ............... | 369/59.26 |
| 5,353,215 A | * | 10/1994 | Dinwiddie et al. ........ | 369/47.46 |
| 5,453,968 A | * | 9/1995 | Veldhuis et al. .......... | 369/47.12 |
| 6,134,200 A | * | 10/2000 | Timmermans ............ | 369/47.28 |

* cited by examiner

*Primary Examiner*—Gregory Morse
*Assistant Examiner*—Paul E. Callahan
(74) *Attorney, Agent, or Firm*—Morrison & Foerster LLP

(57) ABSTRACT

Accordingly, an improved method for recording data on an optical medium is disclosed which includes receiving and encoding a first set of data frames by a CIRC encoder to generate a second set of data frames. A control byte is then added to each of the second set of data frames to generate a third set of data frames. The third plurality of frames of data are received and encoded at an EFM encoder to generate a section comprising a plurality of Channel frames. The control byte of a sequentially first one of the third set of data frames is replaced with a SYNC 0' byte selected from the limited group of previously unassigned fourteen-bit combinations. The control byte of a sequentially second one of the third set of data frames is also replaced with a SYNC 1' byte selected from the same group. The SYNC 1' byte is different from the SYNC 0' byte, and the SYNC 0' and SYNC 1' bytes are selected such that at least one of the following conditions is met: (a) the SYNC 0' byte is not equal to 00100000000001, and (b) the SYNC 1' byte is not equal to 00000000010010. The section is then recorded on the optical medium. Using this method, a proprietary data format similar to a standard data format may easily be generated. The proprietary data format may not be read or copied by standard CD playback and copying systems.

14 Claims, 2 Drawing Sheets

METHOD AND SYSTEM FOR RECORDING DATA ON AND READING DATA FROM AN OPTICAL MEDIUM

CROSS REFERENCE TO RELATED APPLICATION

This application is related to co-pending Provisional Patent Application Serial No. 60/104,296, filed Oct. 14, 1998 which is incorporated herein by reference in its entirety.

TECHNICAL FIELD OF THE INVENTION

This disclosure is directed to optical media and more specifically to a method and system for recording data on and reading data from an optical medium such as compact disks.

BACKGROUND OF THE INVENTION

Compact disks are well known in both the audio and video field. The term "compact disk" herein refers generally to optically readable media, playable in CD players and/or computer CD drives, and typically carrying audio and/or video program material and includes both non recordable CDs and recordable CDs.

One technical problem addressed herein is that in addition to commercially available compact disks players, both as standalone devices and drives installed in computers, compact disk writers ("burners") are now commercially available. These writers accept a suitable data stream and write the data onto a recordable compact disk. An example is the Hewlett-Packard CD-Writer Plus 8100i CD-RW drive which installs in a standard personal computer drive bay, and which connects to the hard drive IDE connector in such a computer. Other versions connect to the computer SCSI or parallel port. CD writers also operate as CD players. Such writers now cost only about $400.00, and typically are sold bundled with suitable software, such as Adaptec's Easy-CD Creator, which enables copying of a CD or other data (e.g., from a hard drive) to a recordable CD.

Since the material on a compact disk is typically in digital form, a copy of a compact disk contains all of the program material (user data) of the original. This of course encourages unauthorized copying, typically of copyrighted program material such as games, movies, etc., using such CD writers.

Furthermore, a CD recorded using standard data formats can be read or played by any commercially available CD player or CD-ROM drive. This can lead to the unauthorized usage of CDs, whether they be originals or illegal copies, by anyone with a commercially available CD player or CD-ROM drive.

SUMMARY OF THE INVENTION

Therefore, a need has arisen for a recording and playback system and method for optical media such as compact disks that addresses the disadvantages and deficiencies of the prior art. In particular, a need has arisen for a recording and playback system and method with a simply generated proprietary data format which is unreadable by standard compact disk players and CD-ROMs.

Accordingly, an improved method for recording data on an optical medium is disclosed. In one embodiment, the method includes receiving and encoding a first set of data frames by a CIRC encoder to generate a second set of data frames. A control byte is then added to each of the second set of data frames to generate a third set of data frames. The third plurality of frames of data are received and encoded at an EFM encoder to generate a section comprising a plurality of Channel frames. The control byte of a sequentially first one of the third set of data frames is replaced with a SYNC 0' byte selected from the following group: 00000000001000, 00000000001001, 00000000010000, 00000000010001, 00000000010010, 00001000000000, 00010000000000, 00100000000001, 01001000000000, 10001000000000, and 10010000000000. The control byte of a sequentially second one of the third set of data frames is also replaced with a SYNC 1' byte selected from the same group. The SYNC 1' byte is different from the SYNC 0' byte, and the SYNC 0' and SYNC 1' bytes are selected such that at least one of the following conditions is met: (a) the SYNC 0' byte is not equal to 00100000000001, and (b) the SYNC 1' byte is not equal to 00000000010010. The section is then recorded on the optical medium.

In accordance with another aspect of the present invention, an optical medium recording system is disclosed. The system includes a CIRC encoder that receives and encodes a first set of data frames to generate a second set of data frames. A control block adds a control byte to each one of the second set of data frames to generate a third set of data frames. An EFM encoder receives the third set of data frames and encodes selected portions of the third set of data frames to generate a section comprising a plurality of Channel frames. The EFM encoder also replaces the control byte of a sequentially first one of the third set of data frames with a SYNC 0' byte selected from the following group: 00000000001000, 00000000001001, 00000000010000, 00000000010001, 00000000010010, 00001000000000, 00010000000000, 00100000000001, 01001000000000, 10001000000000, and 10010000000000, and replaces the control byte of a sequentially second one of the third set of data frames with a SYNC 1' byte selected from the same group. The SYNC 1' byte is different from the SYNC 0' byte, and the EFM encoder also selects the SYNC 0' and SYNC 1' bytes such that at least one of the following conditions is met: (a) the SYNC 0' byte is not equal to 00100000000001, and (b) the SYNC 1' byte is not equal to 00000000010010. A recording mechanism receives the section and records the section on the optical medium.

In accordance with yet another aspect of the present invention, a method for reading data from an optical medium is disclosed. The method includes locating a section of data by scanning the optical medium for a SYNC 0' byte and a SYNC 1' byte, the SYNC 0' and SYNC 1' byte each being selected from the following group: 00000000001000, 00000000001001, 00000000010000, 00000000010001, 00000000010010, 00001000000000, 00010000000000, 00100000000001, 01001000000000, 10001000000000, and 10010000000000, the SYNC 1' byte being different from the SYNC 0' byte. The section of data is then read from the optical medium.

An advantage of the present invention is that a proprietary data format similar to a standard data format may easily be generated. Another advantage of the present invention is that the proprietary data format may not be read or copied by standard CD playback and copying systems.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
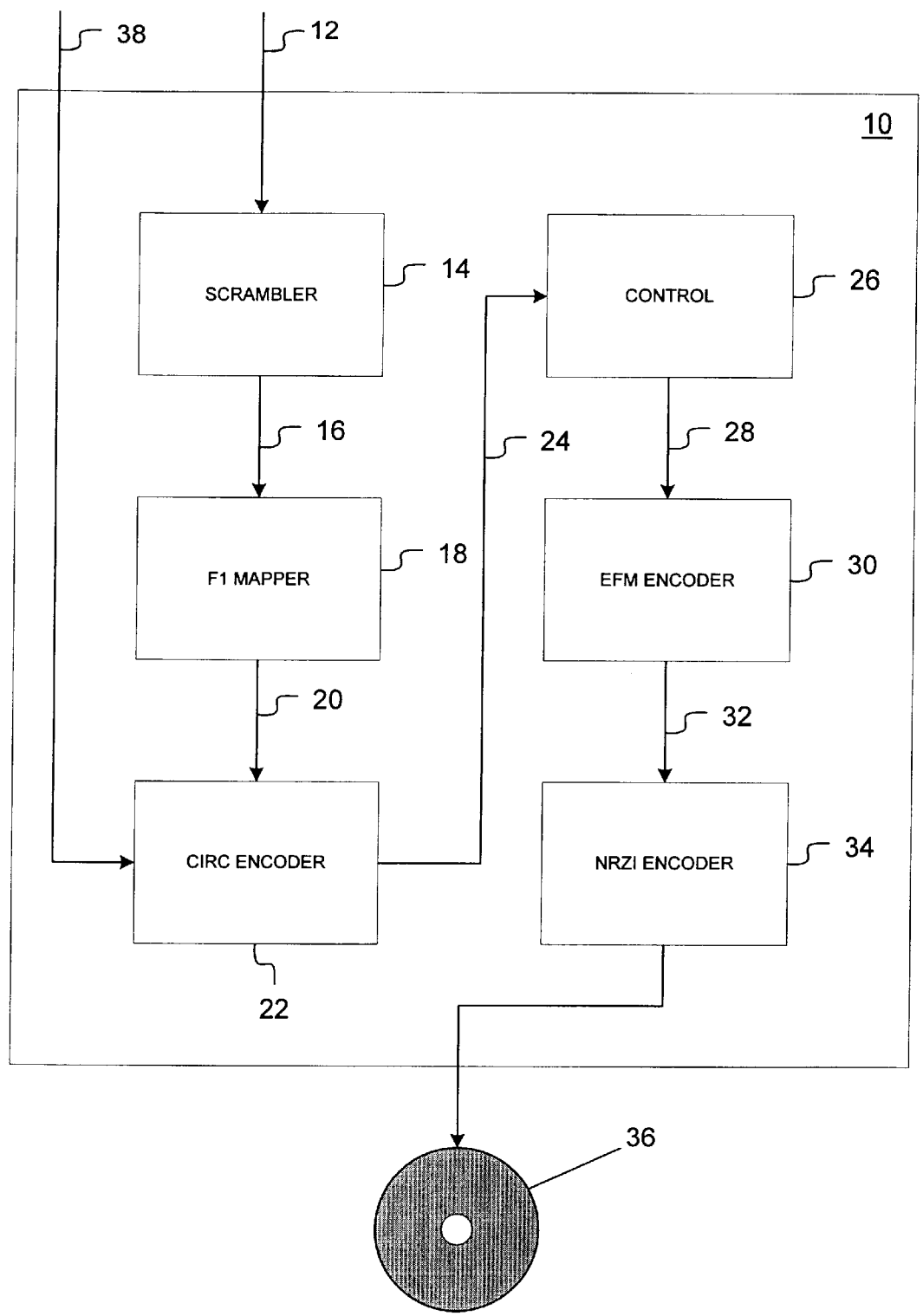
FIG. 1 is a block diagram of a portion of a CD-ROM recorder constructed in accordance with the present invention.

The preferred embodiments of the present invention and their advantages are best understood by referring to FIG. 1 of the drawings. Like numerals are used for like and corresponding parts of the various drawings.

Referring to FIG. 1, a block diagram of a portion of a CD-ROM recorder 10 is shown. This portion of CD-ROM recorder 10 receives an input signal 12 representing an information track comprised of eight-bit bytes grouped into sectors. For purposes of illustration, input signal 12 will be assumed to constitute a single sector. In accordance with the ISO/IEC 10149 (1995-07-15) standard, a sector includes 2352 bytes, of which either 2336 bytes or 2048 bytes may be user data. For example, in Sector Mode (01) described in ISO/IEC 10149 (1995-07-15), a sector comprises a sync field (12 bytes), a header field (4 bytes), user data (2048 bytes), an error detecting and correction (EDC) field (4 bytes), an intermediate field (8 bytes), a P-parity field (172 bytes), and a Q-parity field (104 bytes).

Input signal 12 is received by a scrambler 14, which uses an $X^{15}+X+1$ algorithm to scramble bytes 12 to 2351 (but not the sync field) of a sector. An output signal 16 representing the scrambled sector is then transmitted to a mapper 18, which maps the scrambled sector into a series of 24-byte F1 frames which make up an output signal 20. Mapper 18 reverses the order of each even-odd numbered pair of bytes in the scrambled sector, as described in ISO/IEC 10149 (1995-07-15).

The F1 frames of output signal 20 are then fed into a Cross Interleaved Reed-Solomon Code (CIRC) encoder 22, which transforms the 24-byte F1 frames into a set of 32-byte F2 frames which constitute an output signal 24. CIRC encoder 22 redistributes the F1 frame bytes among F2 frames and adds eight eight-bit bytes with parity information to each F2 frame, as described in ISO/IEC 10149 (1995-07-15).

A control block 26 converts the 32-byte F2 frames of signal 24 to an output signal 28 comprising 33-byte F3 frames by adding an eight-bit control byte at the beginning of each F2 frame. These control bytes are generated such that each bit-position in a control byte corresponds to a "channel" (p-channel, q-channel, . . . w-channel), with the content of each channel being defined by ISO/IEC 10149 (1995-07-15). The F3 frames of signal 28 are grouped by their control bytes into 98-frame sections, which bear no relation to the original information track sectors of the input signal 12.

The F3 frames of signal 28 are fed into an eight-to-fourteen modulation (EFM) encoder 30, which generates an output signal 32 comprising a so-called channel frame from each F3 frame. To generate a channel frame, EFM encoder 30 performs several functions, one of which is to convert each eight-bit byte of an F3 frame of signal 28 into a fourteen-bit byte according to a conversion table given in ISO/IEC 10149 (1995-07-15). (Since the binary values generated by EFM encoder 30 are to be written to an actual CD channel, these values are referred to as "Channel bits.") The fourteen-Channel bit bytes in the aforementioned conversion table are selected from a limited number of fourteen-bit bytes in which there are at least two and at most 10 zeros between two ones. For convenience, this criterion will be referred to herein as the "2/10 rule."

Not every byte of every F3 frame of signal 28 is converted to a fourteen-Channel bit byte using the aforementioned conversion table. The first two control bytes of a section (i.e. the control bytes of the first two F3 frames of a section) are not converted according to the conversion table, but are given specialized fourteen-bit patterns that are not included in the conversion table. In a conventional CD recorder, as described by ISO/IEC 10149 (1995-07-15), the first control byte is assigned a specialized pattern known as the SYNC 0 byte, which has the following value: 00100000000001. Likewise, the second control byte is assigned a specialized pattern known as the SYNC 1 byte, which has the following value: 00000000010010. These conventional SYNC bytes will be discussed more fully below.

At the beginning of a channel frame, EFM encoder 30 adds a sync header comprising a special sequence of 24 Channel bits. EFM encoder 30 also adds three Channel bits known a "merging Channel bits" after the sync header and between each 14-Channel bit byte. These merging Channel bits are used to maintain compliance with the 2/10 rule in the Channel bit stream as a whole.

A channel frame of signal 32 therefore consists of a sync header (24 Channel bits), merging bits (3 Channel bits), a control byte (14 Channel bits), merging bits (3 Channel bits), and 32 bytes of 14 Channel bits each, each byte being followed by 3 merging Channel bits, for a total of 588 Channel bits. These channel frames are encoded by an NRZI encoder 34 and recorded on a compact disk 36.

Scrambler 14, mapper 18, CIRC encoder 22, control block 26 and NRZI encoder 34 may be conventional CD player or CD-ROM components performing the functions specified in ISO/IEC 10149 (1995-07-15). It will be understood that these components, as well as EFM encoder 30, may be embodied in hardware, software or firmware.

It will be understood that the process for reading a CD-ROM is substantially the reverse of the writing process outlined above. Thus, when CD 36 is read by a conventional CD player, the CD player scans the disk looking for the SYNC 0 and SYNC 1 values in order to locate the beginning of a section. When a section has been located, the Channel bits contained therein are extracted, decoded and unscrambled (with various error-checking algorithms) to reproduce the original information track sector(s) of signal 12.

As previously mentioned, the SYNC 0 and SYNC 1 bytes are conventionally used as the first two control bytes of a section. These two bytes are chosen from the limited number of 14-bit bytes that conform to the 2/10 rule. There are 16,384 unique 14-bit bytes, of which only 267 conform to the 2/10 rule. Of those 267, 256 are listed in the ISO/IEC 10149 (1995-07-15) as EFM conversion values for eight-bit bytes. This leaves 11 bytes which are compliant with the 2/10 rule and which are unused in the conversion table. These bytes, two of which are conventionally designated as the SYNC 0 and SYNC 1 bytes described above, are listed in Table A:

TABLE A

| Byte | Usage |
| --- | --- |
| 00000000001000 | none |
| 00000000001001 | none |
| 00000000010000 | none |

TABLE A-continued

| Byte | Usage |
| --- | --- |
| 00000000010001 | none |
| 00000000010010 | SYNC 1 |
| 00001000000000 | none |
| 00010000000000 | none |
| 00100000000001 | SYNC 0 |
| 01001000000000 | none |
| 10001000000000 | none |
| 10010000000000 | none |

As is apparent from an examination of Table A, there are nine fourteen-bit bytes that are compliant with the 2/10 rule and are not used either as conventional SYNC bytes or in the 256-byte conversion table.

When CD 36 is read by a conventional CD player, the CD player scans the disk looking for the SYNC 0 and SYNC 1 values in order to locate the beginning of a section. If the conventional SYNC 0 and SYNC 1 values are not used, a conventional CD player would not be able to read the CD.

In accordance with one aspect of the present invention, CD-ROM recorder 10 is modified from a conventional CD-ROM recorder. In particular, EFM encoder 30 is modified so as not to use the conventional SYNC 0 and SYNC 1 values. Instead, EFM encoder 30 uses two of the previously unused values from Table A in place of the SYNC 0 and SYNC 1 values. Thus, for the first control byte of a channel frame, EFM encoder 30 uses a value which will be referred to herein as SYNC 0'. This value may be, for example, 00010000000000. Likewise, for the second control byte of a channel frame 32, EFM encoder 30 uses a value which will be referred to herein as SYNC 1'. This value may be, for example, 00001000000000. Other values from Table A may alternatively be used for SYNC 0' and SYNC 1'.

It may be desirable to use two values from Table A which are not the conventional SYNC 0 and SYNC 1 values in order to enhance the proprietary nature of the resulting CD format. However, it will be understood that one or both of the conventional SYNC 0 and SYNC 1 values may be used for one or both of the SYNC 0' and SYNC 1' values, so long as either SYNC 0' is not equal to SYNC 0 or SYNC 1' is not equal to SYNC 1. Thus, for example, a format in which SYNC 0'=SYNC 1 and SYNC 1'=SYNC 0, which may not be readable by some conventional CD players and CD-ROMs, is contemplated as being within the scope of the present invention.

It will be understood that audio data may also be encoded using the above process. Thus, a signal 38 containing audio data in standard frame format may be fed to CIRC encoder 22. Processing of the audio data then proceeds as previously described.

Figure 2:
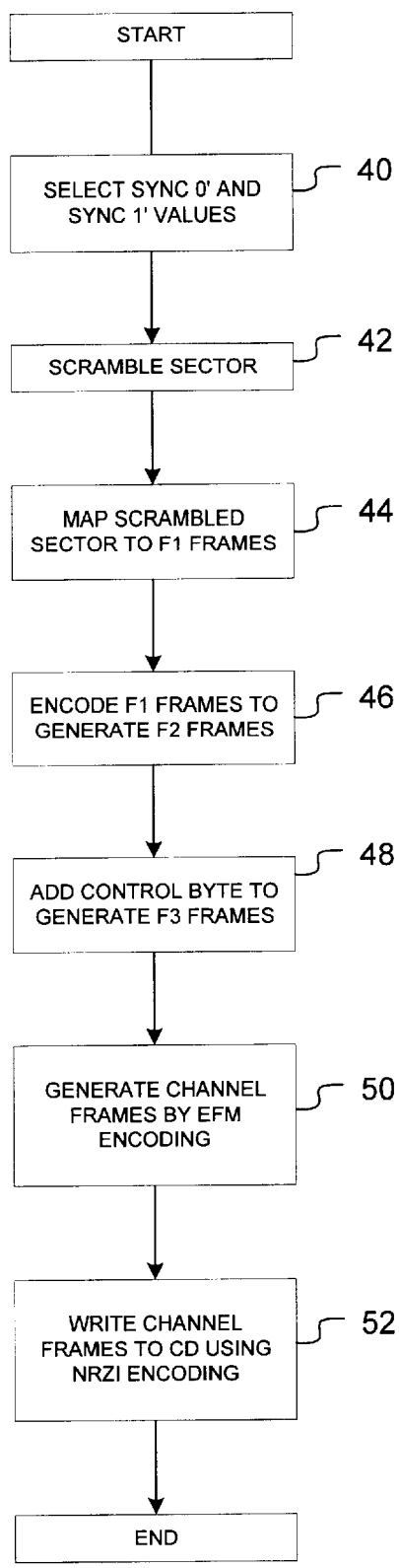
FIG. 2 is a flowchart illustrating a method for recording information on a compact disk.

Referring to FIG. 2, a flowchart illustrating the above-described method for encoding information on a compact disk is shown. The method begins at step 40, where SYNC 0' and SYNC 1' values are selected according to the criteria outlined above. This step may be performed well in advance of the remaining steps of this method. For example, step 40 may be performed during the design of the CD recording device in question, while the remaining steps may be performed at a later time when the CD recording device is put into use. Alternatively, the CD recording device may be configured to allow programmable SYNC 0' and SYNC 1' values to be used, so that selection of these values occurs immediately prior to the commencement of recording.

At step 42, the signal 12 representing a sector of data is scrambled by scrambler 14 to generate output signal 16 representing the scrambled sector. At step 44, mapper 18 maps the scrambled sector to F1 frames, thereby generating signal 20. At step 46, the F1 frames are encoded by CIRC encoder 22 to generate the F2 frames of signal 24. At step 48, control block 26 adds a control byte to each F2 frame to generate the F3 frames of signal 28. At step 50, the channel frames of signal 32 are generated from signal 28 by EFM encoder 30. Finally, at step 52, the channel frames of signal 32 are written to CD 36 by NRZI encoder 34.

It will be appreciated that the above-described method and system for recording data on a compact disk results in a proprietary data format which closely resembles the format specified by ISO/IEC 10149 (1995-07-15). Thus, while a standard compact disk player or CD-ROM drive will be completely unable to read a CD recorded using this system, a recording and playback system compatible with this format may be created by making minor modifications to a standard recording or playback system. Accordingly, a proprietary data format may be created which can safely be assumed to be practicable without a great deal of design effort or testing.

Although the present invention and its advantages have been described in detail, it should be understood that various changes, substitutions, and alterations can be made therein without departing from the spirit and scope of the invention as defined by the appended claims.

I claim:

1. A method for recording data on an optical medium, comprising:

receiving a first plurality of frames of data at a Cross Interleave Reed-Solomon Code (CIRC) encoder;

encoding the first plurality of frames of data by the CIRC encoder to generate a second plurality of frames of data;

adding a control byte to each one of the second plurality of frames of data to generate a third plurality of frames of data;

receiving the third plurality of frames of data at an eight-to-fourteen modulation (EFM) encoder;

encoding selected portions of the third plurality of frames of data by the EFM encoder to generate a section comprising a plurality of Channel frames;

replacing the control byte of a sequentially first one of the third plurality of frames of data with a SYNC 0' byte selected from the following group: 00000000001000, 00000000001001, 00000000010000, 00000000010001, 00000000010010, 00001000000000, 00010000000000, 00100000000001, 01001000000000, 10001000000000, and 10010000000000;

replacing the control byte of a sequentially second one of the third plurality of frames of data with a SYNC 1' byte selected from the following group: 00000000001000, 00000000001001, 00000000010000, 00000000010001, 00000000010010, 00001000000000, 00010000000000, 00100000000001, 01001000000000, 10001000000000, and 10010000000000, the SYNC 1' byte being different from the SYNC 0' byte; and recording the section on the optical medium;

wherein the SYNC 0' and SYNC 1' bytes are selected such that at least one of the following conditions is met: (a) the SYNC 0' byte is not equal to 00100000000001, and (b) the SYNC 1' byte is not equal to 00000000010010.

2. The method of claim 1, further comprising receiving at least one information track sector of data; and generating the first plurality of frames of data from the at least one information track sector of data.

3. The method of claim 2, wherein generating the first plurality of frames of data comprises:

scrambling the information track sector of data to generate a scrambled sector; and mapping the scrambled sector into the first plurality of frames of data.

4. The method of claim 1, wherein receiving the first plurality of frames of data at the CIRC encoder comprises receiving a plurality of frames of audio data at the CIRC encoder.

5. The method of claim 1, wherein generating the section comprises adding merging bits between EFM-encoded bytes of the third plurality of frames.

6. The method of claim 5, wherein generating the section further comprises adding a sync header at a beginning of the section.

7. A method for reading data from an optical medium, comprising:

locating a section of data by scanning the optical medium for a SYNC 0' byte and a SYNC 1' byte, the SYNC 0' and SYNC 1' byte each being selected from the following group: 00000000001000, 00000000001001, 00000000010000, 00000000010001, 00000000010010, 00001000000000, 00010000000000, 00100000000001, 01001000000000, 10001000000000, and 10010000000000, the SYNC 1' byte being different from the SYNC 0' byte, the SYNC 0' and SYNC 1' bytes being such that at least one of the following conditions is met: (a) the SYNC 0' byte is not equal to 00100000000001, and (b) the SYNC 1' byte is not equal to 00000000010010; and reading the section of data from the optical medium.

8. The method of claim 7, further comprising receiving at least a portion of the section of data at an eight-to-fourteen modulation (EFM) decoder; and decoding the portion of the section of data at the EFM decoder to generate a first plurality of frames of data.

9. The method of claim 8, further comprising extracting merging bits and a sync header from the section of data prior to decoding the portion of the section of data at the EFM decoder.

10. The method of claim 8, further comprising extracting a control byte from each of the first plurality of frames of data to generate a second plurality of frames of data.

11. The method of claim 10, further comprising receiving the second plurality of frames of data at a Cross Interleaved Reed-Solomon Code (CIRC) decoder; and decoding the second plurality of frames of data at the CIRC decoder to generate a third plurality of frames of data.

12. The method of claim 11, further comprising mapping and unscrambling the third plurality of frames to generate a sector of data.

13. An optical medium recording system comprising:

a Cross Interleave Reed-Solomon Code (CIRC) encoder operable to receive and encode a first plurality of frames of data to generate a second plurality of frames of data;

a control block operable to add a control byte to each one of the second plurality of frames of data to generate a third plurality of frames of data;

an eight-to-fourteen modulation (EFM) encoder operable to receive the third plurality of frames of data, and operable to encode selected portions of the third plurality of frames of data to generate a section comprising a plurality of Channel frames, the EFM encoder being further operable to replace the control byte of a sequentially first one of the third plurality of frames of data with a SYNC 0' byte selected from the following group: 00000000001000, 00000000001001, 00000000010000, 00000000010001, 00000000010010, 00001000000000, 00010000000000, 00100000000001, 01001000000000, 10001000000000, and 10010000000000, the EFM encoder being further operable to replace the control byte of a sequentially second one of the third plurality of frames of data with a SYNC 1' byte selected from the following group: 00000000001000, 00000000001001, 00000000010000, 00000000010001, 00000000010010, 00001000000000, 00010000000000, 00100000000001, 01001000000000, 10001000000000, and 10010000000000, the SYNC 1' byte being different from the SYNC 0' byte, the EFM encoder being further operable to select the SYNC 0' and SYNC 1' bytes such that at least one of the following conditions is met: (a) the SYNC 0' byte is not equal to 00100000000001, and (b) the SYNC 1' byte is not equal to 00000000010010; and a recording mechanism operable to receive the section and to record the section on the optical medium.

14. The optical medium recording system of claim 13, further comprising a scrambler operable to receive at least one information track sector of data, and operable to scrambling the information track sector of data to generate a scrambled sector; and a mapper operable to map the scrambled sector into the first plurality of frames of data.

* * * * *